United States Patent
Hammond (10) Patent No.: US 8,727,766 B2
(45) Date of Patent: May 20, 2014

(54) NOZZLE-TIP INSULATOR HAVING A BODY DEFINING A VOID FORMATION COAXIALLY CONCENTRICALLY POSITIONED RELATIVE TO EACH OTHER

(75) Inventor: Gregory Ray Hammond, Georgetown (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 108 days.

(21) Appl. No.: 13/639,025

(22) PCT Filed: Mar. 29, 2011

(86) PCT No.: PCT/CA2011/050160
§ 371 (c)(1),
(2), (4) Date: Oct. 2, 2012

(87) PCT Pub. No.: WO2011/127596
PCT Pub. Date: Oct. 20, 2011

(65) Prior Publication Data
US 2013/0022705 A1   Jan. 24, 2013

Related U.S. Application Data

(60) Provisional application No. 61/323,374, filed on Apr. 13, 2010, provisional application No. 61/333,416, filed on May 11, 2010.

(51) Int. Cl.
*B29C 45/20* (2006.01)

(52) U.S. Cl.
USPC .......................................... 425/549; 425/564

(58) Field of Classification Search
CPC .......................... B29C 45/27; B29C 45/2806
USPC .................. 425/549, 562, 563, 564, 565, 566
See application file for complete search history.

(56) References Cited

U.S. PATENT DOCUMENTS

| | | | |
|---|---|---|---|
| 4,854,851 A * | 8/1989 | Gellert | 425/549 |
| 6,422,857 B2 * | 7/2002 | Wright et al. | 425/549 |
| 6,988,883 B2 * | 1/2006 | Babin et al. | 425/549 |
| 7,018,197 B2 * | 3/2006 | Babin et al. | 425/549 |
| 7,507,081 B2 * | 3/2009 | Guenther et al. | 425/549 |
| 7,566,216 B2 * | 7/2009 | Kmoch et al. | 425/549 |

FOREIGN PATENT DOCUMENTS

| | | |
|---|---|---|
| CA | 2378263 C | 9/2003 |
| CA | 2543057 A1 | 10/2007 |

OTHER PUBLICATIONS

International Search Report, 3 pages.

\* cited by examiner

*Primary Examiner* — Tim Heitbrink (57) ABSTRACT

A nozzle-tip insulator (100), comprising: a nozzle-contact surface (102); a mold-gate contact surface (104) being offset from the nozzle-contact surface (102); and a body (106) connecting the nozzle-contact surface (102) with the mold-gate contact surface (104), the body (106) being resiliently compressible, the body (106) defining a void formation (108), and the body (106) and the void formation (108) being coaxially concentrically positioned relative to each other.

14 Claims, 8 Drawing Sheets

NOZZLE-TIP INSULATOR HAVING A BODY DEFINING A VOID FORMATION COAXIALLY CONCENTRICALLY POSITIONED RELATIVE TO EACH OTHER

TECHNICAL FIELD

An aspect of the present invention generally relates to (but is not limited to) a nozzle-tip insulator having a body defining a void formation that are coaxially concentrically positioned relative to each other.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' invention so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The total clamp force needed is determined by the projected area of the part being molded. This projected area is multiplied by a clamp force of from two to eight tons for each square inch of the projected areas. As a rule of thumb, four or five tons per square inch can be used for most products. If the plastic material is very stiff, it will require more injection pressure to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

According to one aspect, there is provided a nozzle-tip insulator, comprising: a nozzle-contact surface; a mold-gate contact surface being offset from the nozzle-contact surface; and a body connecting the nozzle-contact surface with the mold-gate contact surface, the body being resiliently compressible, the body defining a void, and the body and the void being coaxially concentrically positioned relative to each other.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 2A-8A depict various schematic representations (that is, cross-sectional views) of the nozzle-tip insulator (100) of FIG. 1; and FIGS. 2B-8B depicts various schematic representations (that is, perspective views) of the nozzle-tip insulator (100) of FIG. 1, which correspond with FIGS. 2A-8A, respectively.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Figures 1A, 1B:
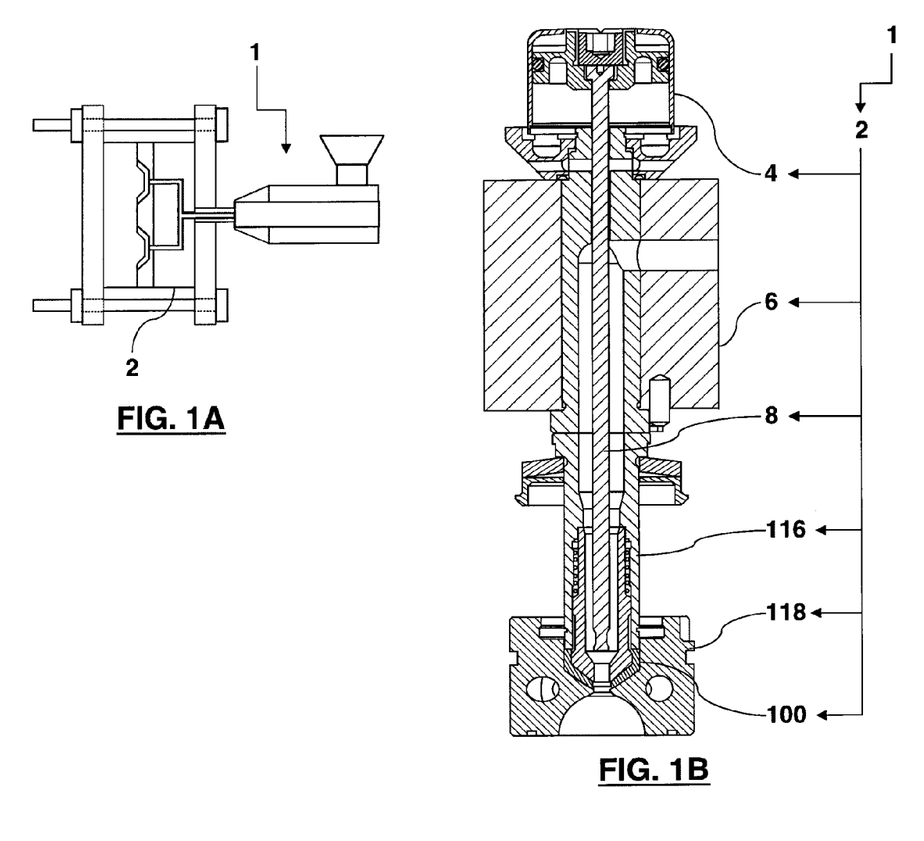
FIGS. 1A and 1B depict schematic representations of a mold-tool assembly (2) of a molding machine (1) using a nozzle-tip insulator (100)

FIGS. 1A and 1B depicts the schematic representations of the mold-tool assembly (2) of the molding machine (1) using the nozzle-tip insulator (100). As depicted in FIG. 1B, the molding machine (1) generally includes a stationary platen and a movable platen, and the mold-tool assembly (2) is supported between the platens. As depicted in FIG. 1B, the mold-tool assembly (2) includes (but is not limited to): a stem actuator (4), a manifold assembly (6), a stem (8), a nozzle assembly (116), a mold-gate assembly (118), and the nozzle-tip insulator (100). The mold-tool assembly (2) (which may also be called a hot-runner system or a runner system), the molding machine (1) (such as an injection-molding machine), and the nozzle-tip insulator (100) all may include components that are known to persons skilled in the art, and these known components will not be described here; these known components are described, at least in part, in the following reference books (for example): (i) "*Injection Mold-* ing Handbook" authored by OSSWALD/TURNG/GRAMANN (ISBN: 3-446-21669-2), (ii) "Infection Molding Handbook" authored by ROSATO AND ROSATO (ISBN: 0-412-99381-3), (iii) "Injection Molding Systems" 3$^{rd}$ Edition authored by JOHANNABER (ISBN 3-446-17733-7) and/or (iv) "Runner and Gating Design Handbook" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

Figure 2A:
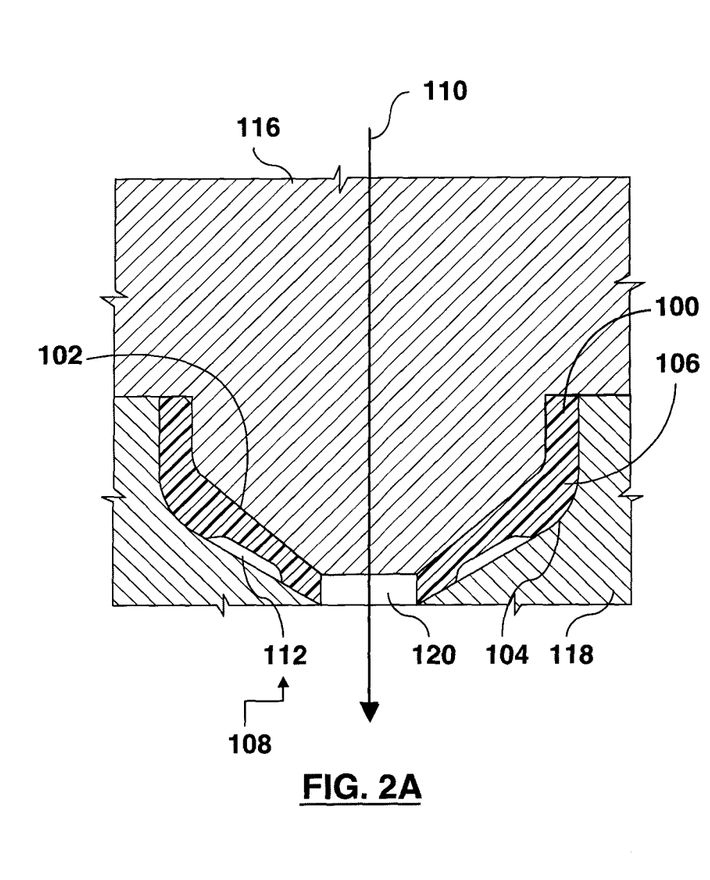
Figure 2B:
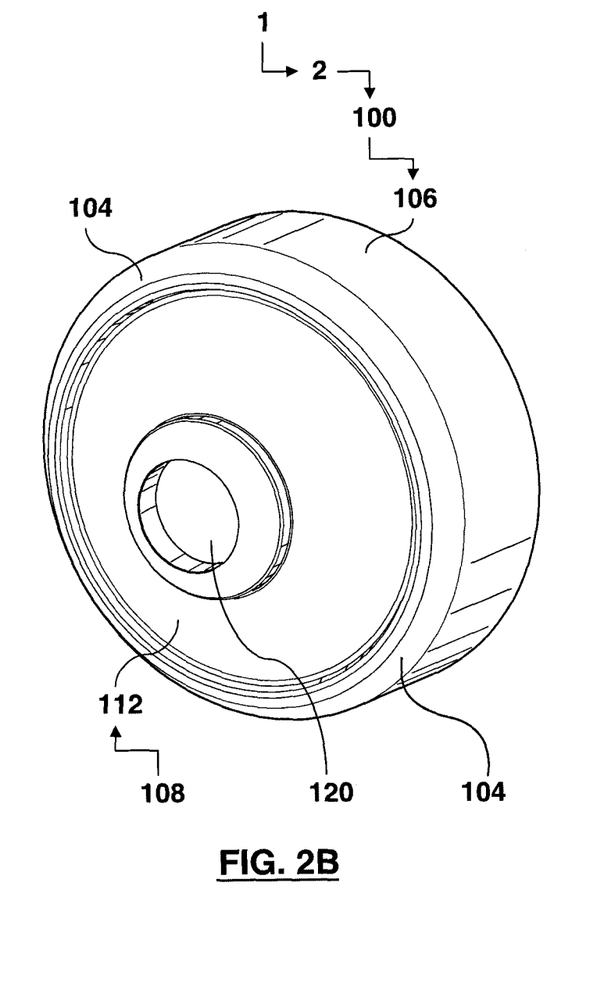

Referring now to FIGS. 2A and 2B, there is depicted an example of the nozzle-tip insulator (100). Generally, the nozzle-tip insulator (100) includes (but is not limited to): (i) a nozzle-contact surface (102), (ii) a mold-gate contact surface (104), and (iii) a body (106). The nozzle-contact surface (102) is used to contact a nozzle assembly (116). The mold-gate contact surface (104) is offset from the nozzle-contact surface (102). The mold-gate contact surface (104) is used to contact a mold-gate assembly (118). The body (106) connects the nozzle-contact surface (102) with the mold-gate contact surface (104). The body (106) is resiliently compressible. The body (106) defines a void formation (108). The body (106) and the void formation (108) are coaxially concentrically positioned relative to each other. The void formation (108) permits the body (106) to uniformly resiliently compress in response to transmission of a load (110) from the nozzle-contact surface (102) to the mold-gate contact surface (104). It is understood that the void formation (108) reduces transmission of the load (110) from the nozzle-contact surface (102) to the mold-gate contact surface (104). Specifically, the void formation reduces the load (110) being transmitted from the nozzle-contact surface (102) to the mold-gate surface (104). The body (106) defines a (centrally-located) orifice (120), which allows melt or resin or molding material to flow from the nozzle assembly (116) to the mold-gate assembly (118) and ultimately to a mold cavity of a mold assembly (known, not depicted). The meaning of "resilience" as follows: the physical property of a material that can return to its original shape or position after deformation that does not exceed its elastic limit. The meaning of "compressible" is as follows: an object that is capable of being compressed or made more compact; the property of being able to occupy less space. The meaning of "concentric" is as follows: having or sharing a common center; concentric objects share the same center, axis or origin with one inside the other. Concentric objects do not necessarily have the same radius. The meaning of "coaxially" is as follows: objects that may have or share a common central axis; objects that each have their own central axis but these axes are parallel to each other. The meaning of "uniformly" is as follows: the same throughout or distributed evenly through an object.

FIGS. 2A, 2B, 3A, 3B, 4A, 4B, 5A, 5B depict the case where the nozzle-tip insulator (100) is adapted so that the void formation (108) includes an annulus-shaped gap (112) that is formed by the body (106).

FIGS. 2A, 2B, 3A, 3B depict the case where the nozzle-tip insulator (100) is adapted to that the annulus-shaped gap (112) is formed on the mold-gate contact surface (104). The annulus-shaped gap (112) may be called a concentric groove (or a set of concentric grooves).

FIGS. 2A, 2B depicts the annulus-shaped gap (112) formed on an outside conical surface, which is called the mold-gate contact surface (104), of the nozzle-tip insulator (100). It will be appreciated that the annulus-shaped gap (112) may also be formed on the mold-gate contact surface (104). It will also be appreciated that the annulus-shaped gap (112) may also be formed on the mold-gate contact surface (104) and the nozzle-contact surface (102). The mold-gate contact surface (104) is tapered. For FIGS. 2A, 2B, the objective is to decrease the surface contact on the mold-gate contact surface (104) of the nozzle-tip insulator (100) by providing a relief on the mold-gate contact surface (104) by which contact with mold-gate assembly (118) to the nozzle-tip insulator (100) may be reduced on the mold-gate contact surface (104). Surface to surface contact is limited to non-relived surfaces where more of the load (110) will be acting thereon. Hence this arrangement may lead to reduce an amount of the load (110) acting on the nozzle-tip insulator (100) in turn to the mold-gate contact surface (104).

Figure 3A:
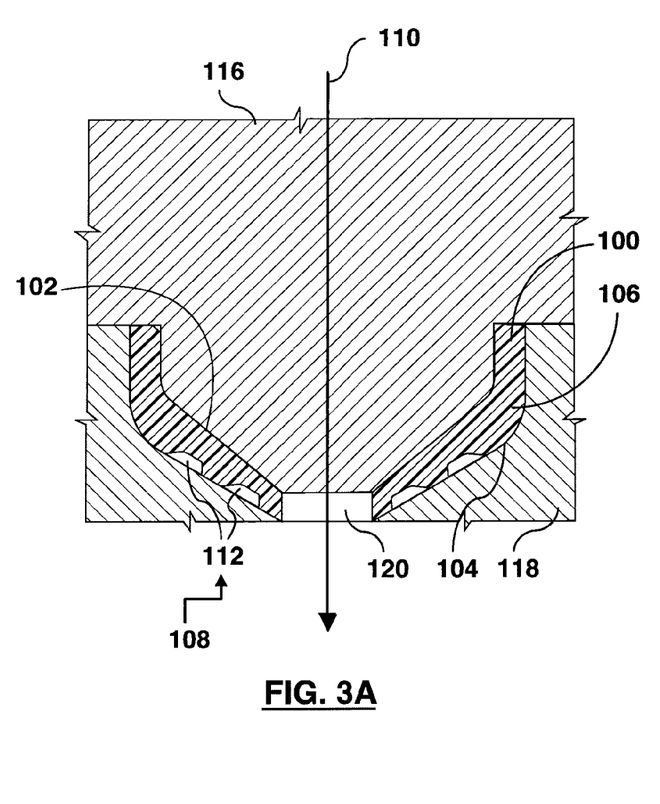
Figure 3B:
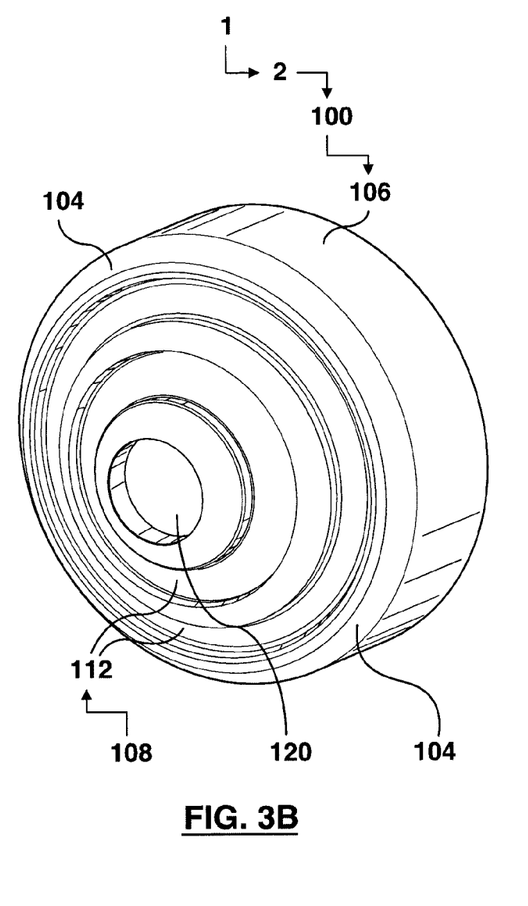

FIGS. 3A and 3B depict the case where the void formation (108) includes two gaps (112) formed on the mold-gate contact surface (104), in which one of the gaps (112) is formed closer to the orifice (120) while the other gap (112) is formed proximate midway between the orifice (120) and the peripheral edge of the nozzle-tip insulator (100). The gaps (112) form a corrugated tapered surface on the mold-gate contact surface (104). For this arrangement, the objective is to decrease the surface contact on the mold-gate contact surface (104) of the nozzle-tip insulator (100) by making a corrugated surface on the mold-gate contact surface (104) of the nozzle-tip insulator (100) there may be a crest and trough, which as a relief on the mold-gate contact surface (104) by which contact with the mold-gate assembly (118) and the nozzle-tip insulator (100) may be reduced. Hence this arrangement may lead to reduce the load acting on the nozzle-tip insulator (100) in turn to the mold-gate assembly (118).

FIGS. 4A, 4B, 5A, 5B depict the case where the nozzle-tip insulator (100) is further adapted so that the annulus-shaped gap (112) is formed on the nozzle-contact surface (102).

Figure 4A:
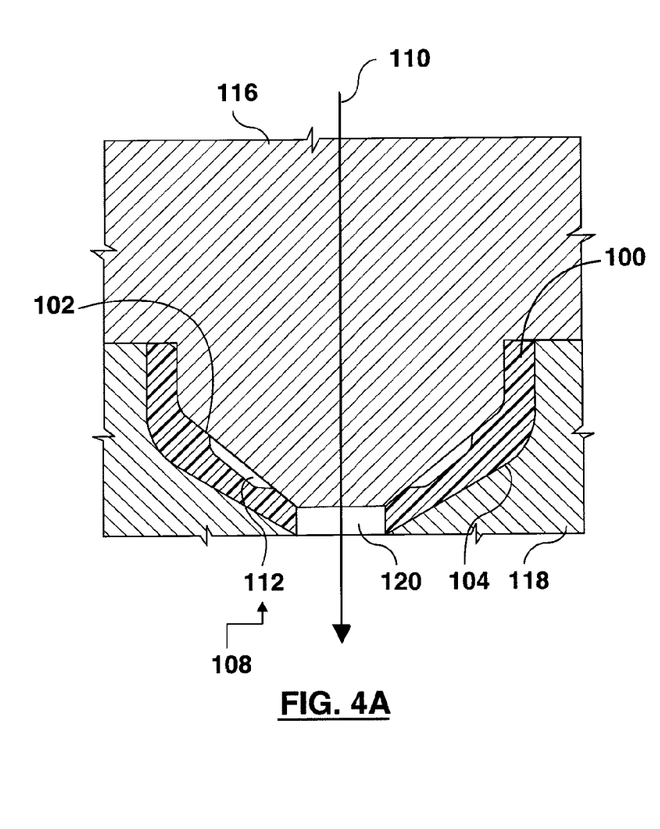
Figure 4B:
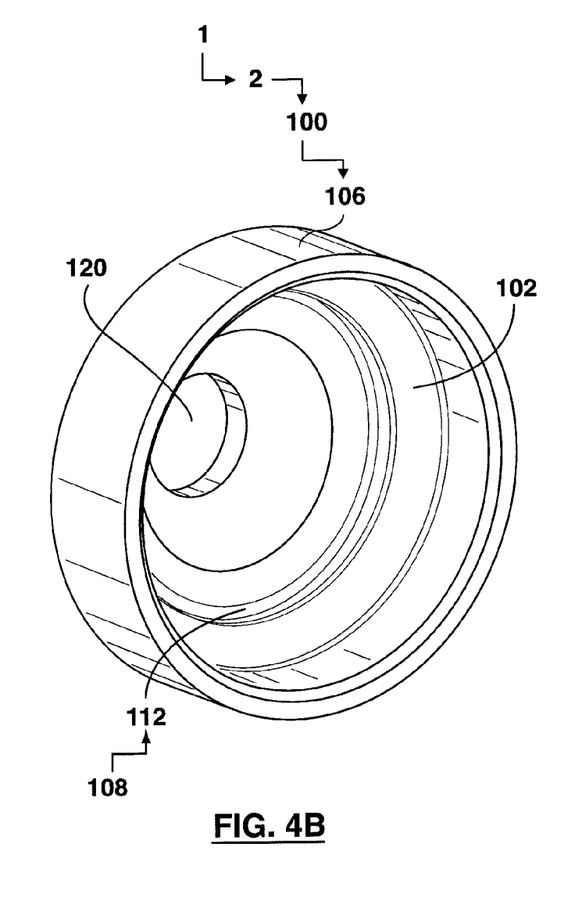

FIGS. 4A, 4B depict the nozzle-tip insulator (100) that is arranged so that the objective is to decrease the surface contact on the nozzle-contact surface (102), which is tapered, by providing a relief formed on the nozzle-contact surface (102) by which contact with the nozzle assembly (116) to the nozzle-tip insulator (100) via the nozzle-contact surface (102) may be reduced. Surface to surface contact is limited in this case to on non-relived surfaces where more load may act thereon. Hence this arrangement may lead to reduce the load acting on the nozzle-tip insulator (100) in turn to the mold-gate assembly (118).

Figure 5A:
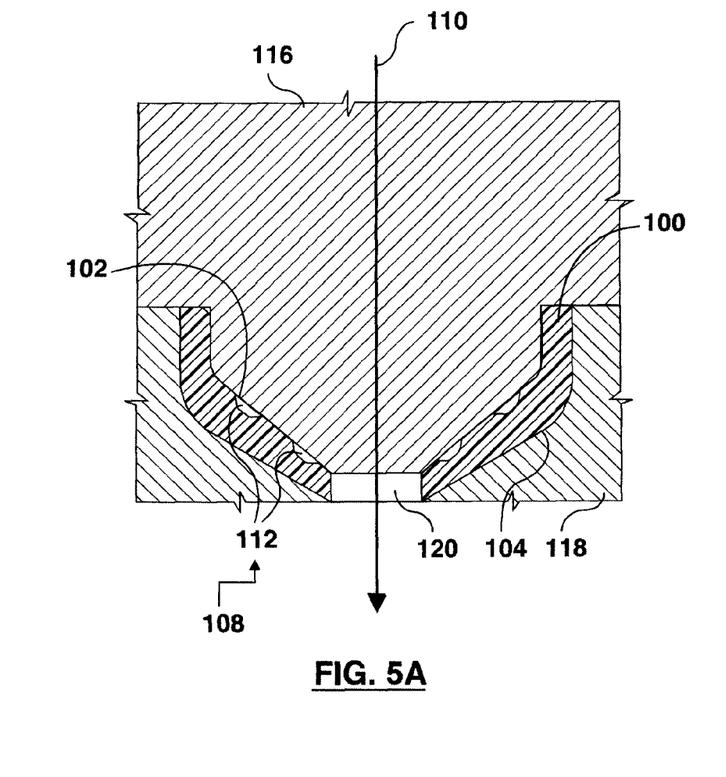
Figure 5B:
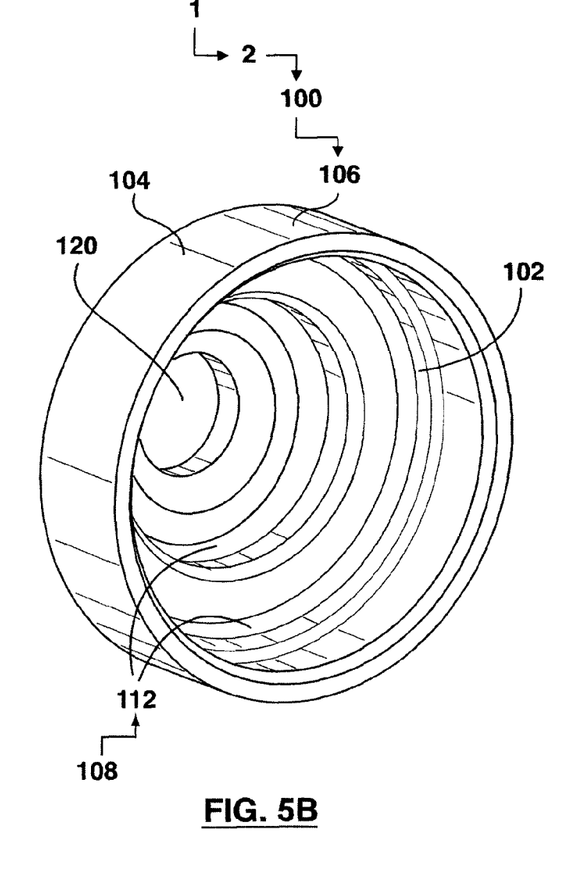

FIGS. 5A and 5B depict the concentrically-placed annular gaps (112) on the nozzle-contact surface (102), which form a corrugated tapered relief on the nozzle-contact surface (102). In this case, the objective is to decrease the surface contact on the nozzle-contact surface (102) of the nozzle-tip insulator (100) by making or forming a corrugated relief on the nozzle-contact surface (102). There may be a crest-and-trough relief. The relief is formed on the nozzle-contact surface (102) by which contact with the nozzle assembly (116) to the nozzle-tip insulator (100) may be reduced. Hence this arrangement may reduce the load acting on the nozzle-tip insulator (100).

Figure 6A:
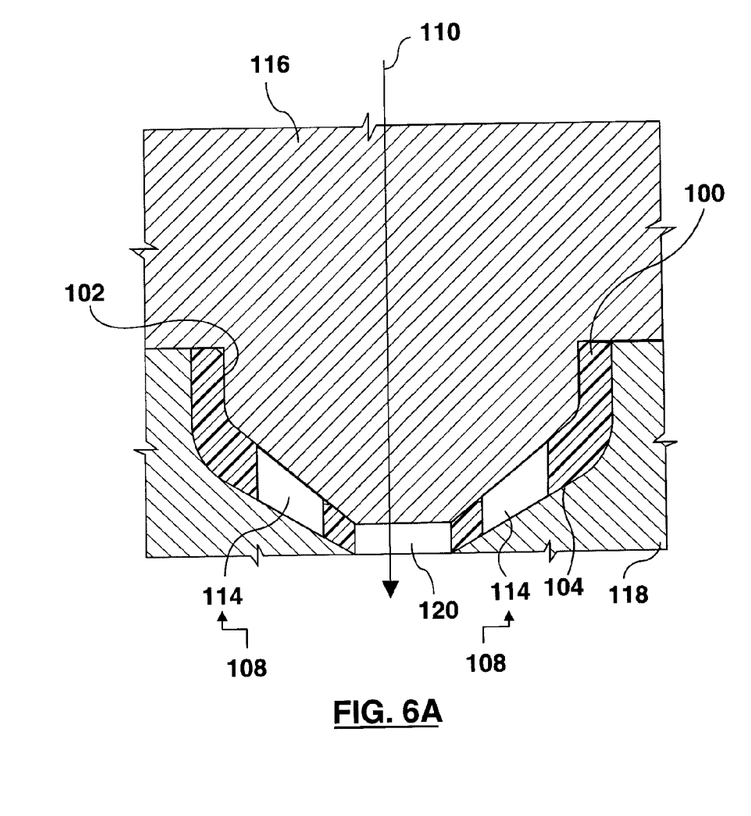
Figure 6B:
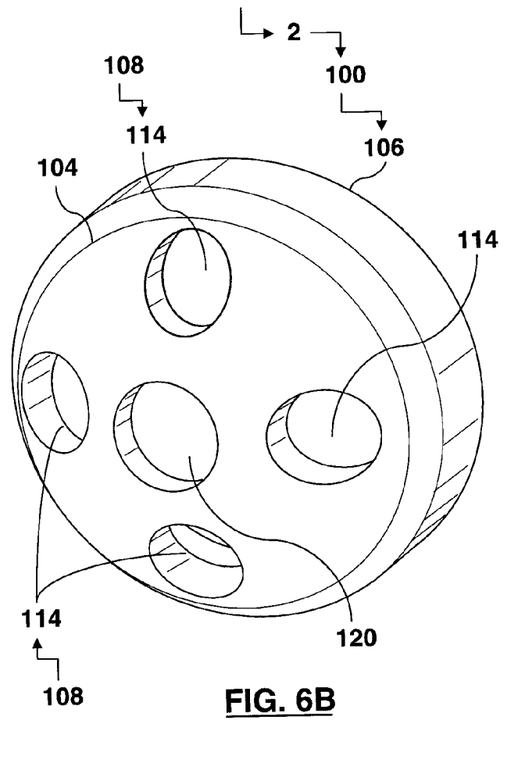

FIGS. 6A, 6B depicts the case where the void formation (108) includes a pattern of pass-through holes (114) that are formed by the body (106). The pattern of pass-through holes (114) may be axially-aligned through holes (that is, axially aligned with the orifice (120), or the pattern of pass-through holes (114) may be aligned perpendicular to the nozzle-contact surface (102) or the mold-gate contact surface (104). The pattern of pass-through holes (114) are a collection of blind holes and/or through holes that are evenly distributed around the orifice (120) with their axes parallel to the axis of the orifice (120). Preferably, the pattern of pass-through holes (114) extends from the nozzle-contact surface (102) to the mold-gate contact surface (104).

Figure 7A:
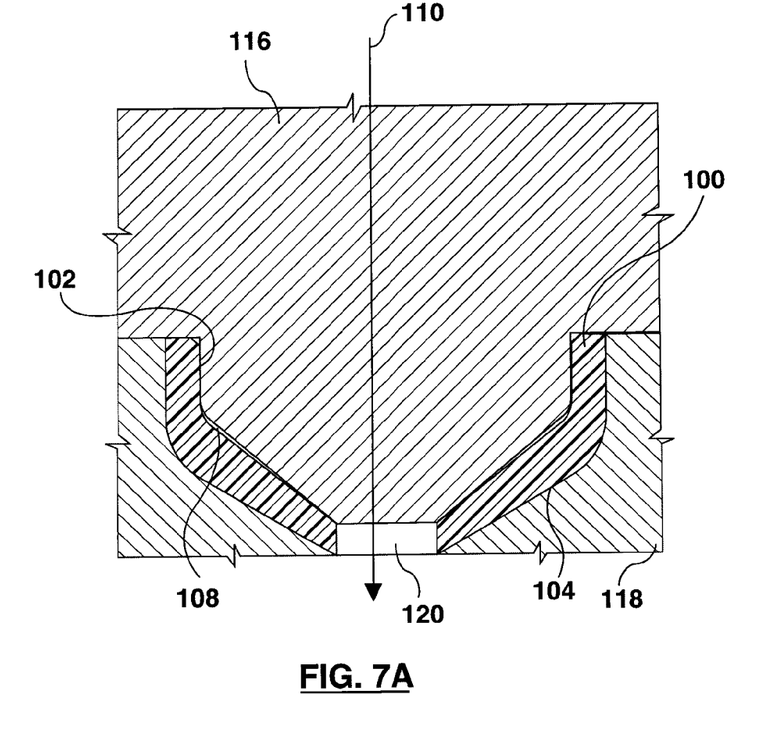
Figure 7B:
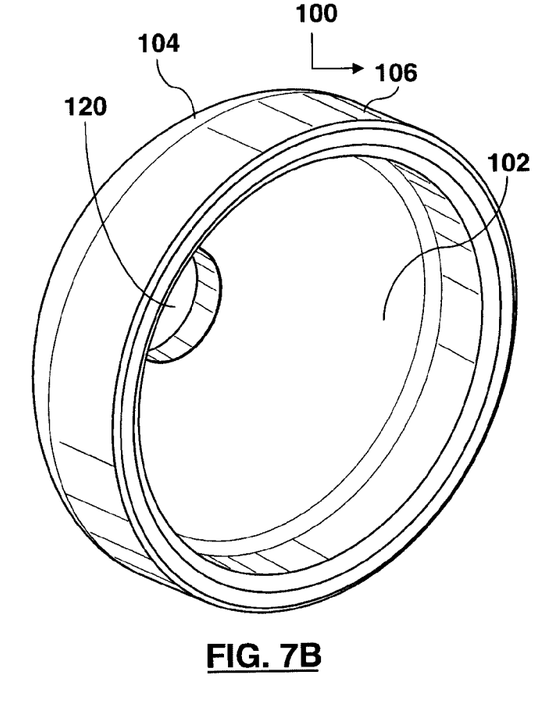

FIG. 7 depicts the case where the void formation (108) is defined between the body (106) and a nozzle assembly (116). Specifically, the nozzle-contact surface (102) contacts the nozzle assembly (116) at an inner peripheral edge of an orifice (120) centrally defined through the body (106), so that the void formation (108) is defined between the body (106) and a nozzle assembly (116). Different angles on the nozzle-contact surface (102) and/or the mold-gate contact surface (104) are different than the corresponding adjacent mating part's surface angle. This arrangement calls for increased (internal) included angle. In this case, the objective is to decrease the surface contact on the nozzle-contact surface (102) by increasing the internal included angle of the nozzle-tip insulator (100)), which makes point contact with the nozzle assembly (116) proximate to the orifice (120). Hence this arrangement may lead to reduce the load acting on the nozzle-tip insulator (100) in turn to the mold-gate assembly (118).

Figure 8A:
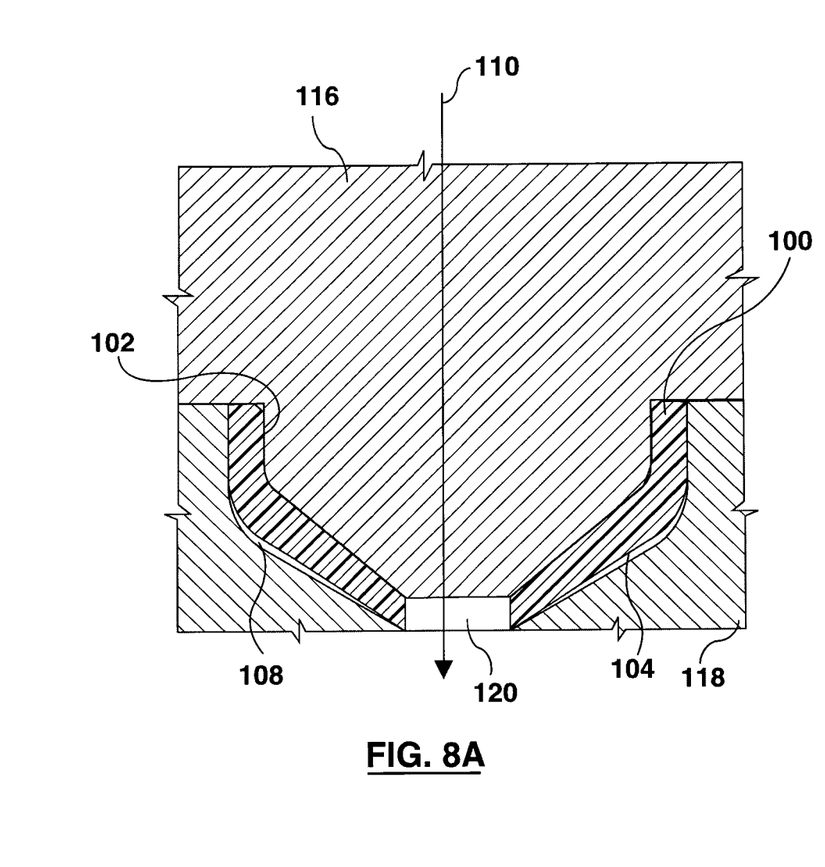
Figure 8B:
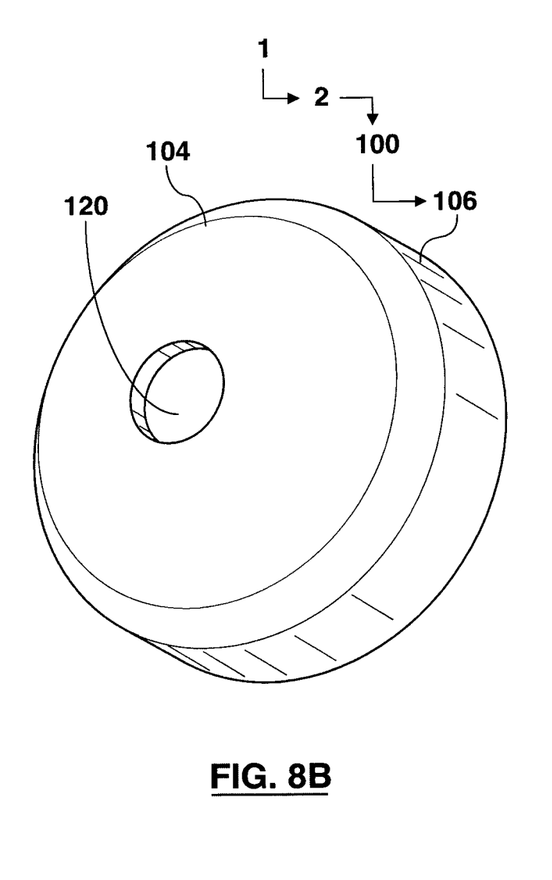

FIG. 8 depicts the case where the void formation (108) is defined between the body (106) and a mold-gate assembly (118). Specifically, the mold-gate contact surface (104) contacts the mold-gate assembly (118) at an outer peripheral edge of an orifice (120) centrally defined through the body (106), and the void formation (108) is defined between the body (106) and mold-gate assembly (118). This arrangement calls for an increased included angle on the mold-gate contact surface (104); it will be appreciated that the increased included angle may be arranged on both the nozzle-contact surface (102) and the mold-gate contact surface (104). For this arrangement, the objective is to decrease the entire surface contacts on the nozzle-contact surface (102) and/or the mold-gate contact surface (104) by increasing the included angles (both internal and external) of the nozzle-tip insulator (100), which makes less contact with the nozzle assembly (116) and the mold-gate assembly (118). Hence this may lead to reduce the load acting on the nozzle-tip insulator (100) in turn to the mold-gate assembly (118).

Several technical effects may be realized by using the foregoing arrangements: the stiffness of the nozzle-tip insulator (100) may be controlled by adjusting the geometry of the grooves, and/or adding grooves on the nozzle-contact surface (102) and the mold-gate contact surface (104) and thus control axial reaction forces that the nozzle-tip insulator (100) may transmits to the mold-gate assembly (118), thereby reducing the wear to the mold-gate assembly (118) and to the nozzle assembly (116). In addition, less force transmitted through the mold-tool assembly (2) may reduce plate bowing. The arrangement described above may reduce the force transmitted to the mold-gate assembly (118), and so by forming grooves in the nozzle-contact surface (102) and the mold-gate contact surface (104) of the nozzle-tip insulator (100), the nozzle-tip insulator (100) ma become less stiff and therefore requires less force to compress the nozzle-tip insulator (100) by the same compression distance.

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim. It is noted that the foregoing has outlined the non-limiting embodiments. Thus, although the description is made for particular non-limiting embodiments, the scope of the present invention is suitable and applicable to other arrangements and applications. Modifications to the non-limiting embodiments can be effected without departing from the scope of the independent claims. It is understood that the non-limiting embodiments are merely illustrative.

What is claimed is:

1. A nozzle-tip insulator (100), comprising:
 a nozzle-contact surface (102);
 a mold-gate contact surface (104) being offset from the nozzle-contact surface (102); and
 a body (106) connecting the nozzle-contact surface (102) with the mold-gate contact surface (104), the body (106) being resiliently compressible, the body (106) defining a void formation (108), and the body (106) and the void formation (108) being coaxially concentrically positioned relative to each other.

2. The nozzle-tip insulator (100) of claim 1, wherein:
 the void formation (108) reduces transmission of a load (110) from the nozzle-contact surface (102) to the mold-gate contact surface (104).

3. The nozzle-tip insulator (100) of claim 1, wherein:
 the void formation (108) permits the body (106) to uniformly resiliently compress in response to transmission of a load (110) from the nozzle-contact surface (102) to the mold-gate contact surface (104).

4. The nozzle-tip insulator (100) of claim 3, wherein:
 the void formation (108) includes an annulus-shaped gap (112) being formed by the body (106).

5. The nozzle-tip insulator (100) of claim 4, wherein:
 the annulus-shaped gap (112) is formed on the mold-gate contact surface (104).

6. The nozzle-tip insulator (100) of claim 4, wherein:
 the annulus-shaped gap (112) is formed on the nozzle-contact surface (102).

7. The nozzle-tip insulator (100) of claim 4, wherein:
 the annulus-shaped gap (112) is formed on the mold-gate contact surface (104) and also formed on the nozzle-contact surface (102).

8. The nozzle-tip insulator (100) of claim 3, wherein:
 the void formation (108) includes a pattern of pass-through holes (114) formed by the body (106).

9. The nozzle-tip insulator (100) of claim 8, wherein:
 the pattern of pass-through holes (114) extends from the nozzle-contact surface (102) to the mold-gate contact surface (104).

10. The nozzle-tip insulator (100) of claim 3, wherein:
the nozzle-contact surface (102) contacts a nozzle assembly (116) at an inner peripheral edge of an orifice (120) centrally defined through the body (106), and
the void formation (108) is defined between the body (106) and the nozzle assembly (116).

11. The nozzle-tip insulator (100) of claim 3, wherein:
the mold-gate contact surface (104) contacts a mold-gate assembly (118) at an outer peripheral edge of an orifice (120) centrally defined through the body (106), and
the void formation (108) is defined between the body (106) and the mold-gate assembly (118).

12. The nozzle-tip insulator (100) of claim 3, wherein:
the nozzle-contact surface (102) contacts a nozzle assembly (116) at an inner peripheral edge of an orifice (120) centrally defined through the body (106),
the mold-gate contact surface (104) contacts a mold-gate assembly (118) at an outer peripheral edge of the orifice (120) centrally defined through the body (106), and
the void formation (108) is defined between:
  the body (106) and the nozzle assembly (116), and
  the body (106) and the mold-gate assembly (118).

13. A mold-tool assembly (2) having:
the nozzle-tip insulator (100) of any one of claims 1 to 12.

14. A molding machine (1) including:
a mold-tool assembly (2) having the nozzle-tip insulator (100) of any one of claims 1 to 12.

\* \* \* \* \*